Figure 1:
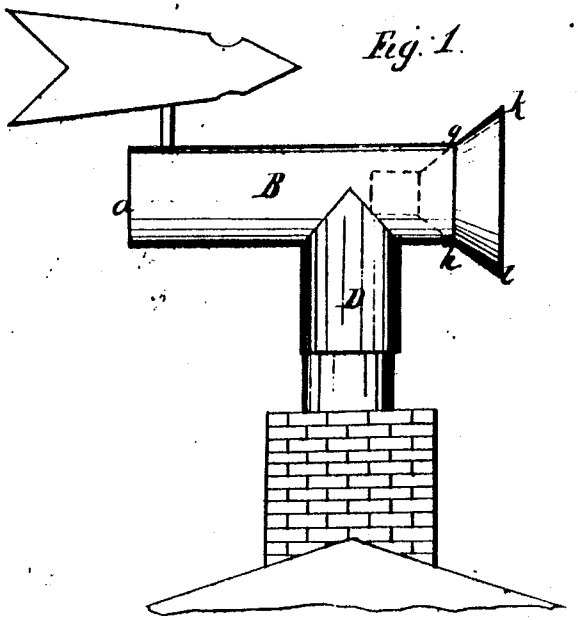
Figure 2:
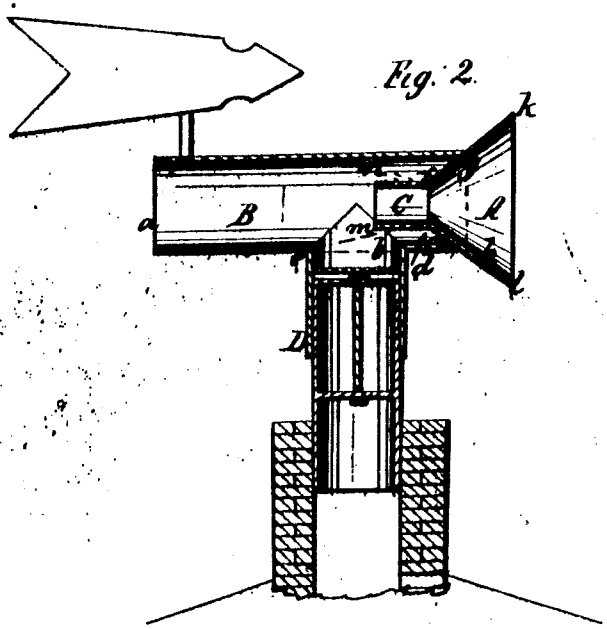

BEST AVAILABLE COPY

BEST AVAILABLE COPY

S. M. Allen.

Chimney Cowl.

No. 65. A.I. Patented Jul. 12, 1843.